(12) United States Patent
Fox et al.

(10) Patent No.: US 10,007,242 B2
(45) Date of Patent: Jun. 26, 2018

(54) MECHANISM FOR CONTROLLING SUBSET OF DEVICES

(71) Applicant: International Business Machines Corporation, Armonk, NY (US)

(72) Inventors: Thomas W. Fox, Hopewell Junction, NY (US); Hans M. Jacobson, White Plains, NY (US); Ravi Nair, Briarcliff Manor, NY (US); Bryan S. Rosenburg, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 408 days.

(21) Appl. No.: 14/736,758

(22) Filed: Jun. 11, 2015

(65) Prior Publication Data
US 2016/0363916 A1 Dec. 15, 2016

(51) Int. Cl.
*G05B 15/02* (2006.01)

(52) U.S. Cl.
CPC .................... *G05B 15/02* (2013.01)

(58) Field of Classification Search
CPC ........... G06F 12/1036; G06F 2212/151; G06F 2212/683; G06F 11/1405; G06F 11/1683; G06F 11/1691; G06F 11/2038; G06F 11/2097; G06F 12/1458; G06F 12/1483; G06F 9/52; G06F 21/78; G06F 21/85; G06F 2221/02; G05B 15/02
See application file for complete search history.

(56) References Cited

U.S. PATENT DOCUMENTS

2006/0259734 A1* 11/2006 Sheu .................... G06F 12/1036
711/203
2014/0334624 A1* 11/2014 Bernsen ................ H04L 9/0833
380/279

* cited by examiner

*Primary Examiner* — Abiy Getachew
(74) *Attorney, Agent, or Firm* — Erik K. Johnson

(57) ABSTRACT

A computer detects a request by a process for access to a shadow control page, wherein the shadow control page allows the process access to one or more devices. The computer assigns the shadow control page and a key to the process associated with the request. The computer detects a request by the process via the assigned shadow control page for creation of a subset of devices from the one or more devices. The computer inputs information detailing an association between the subset of devices and the assigned key into a subset definition table, wherein the subset definition table includes one or more keys and one or more corresponding subsets.

17 Claims, 4 Drawing Sheets

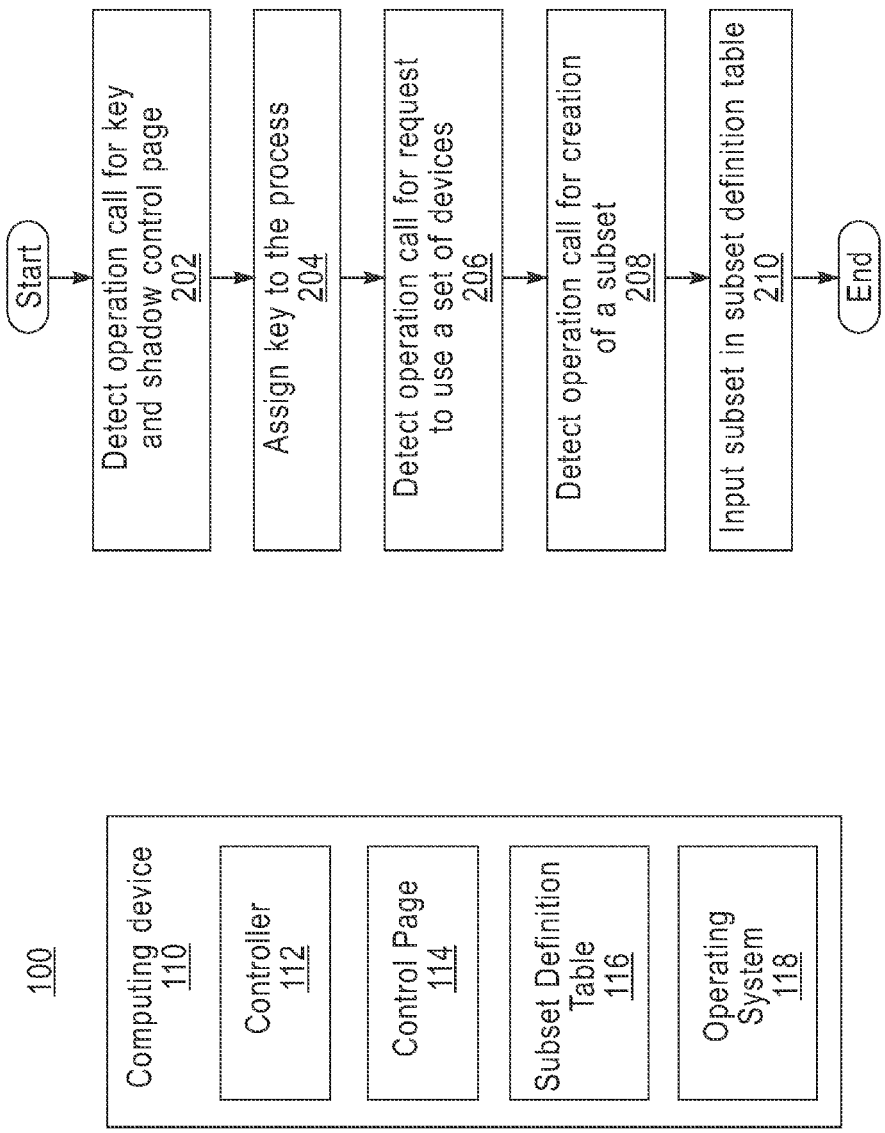

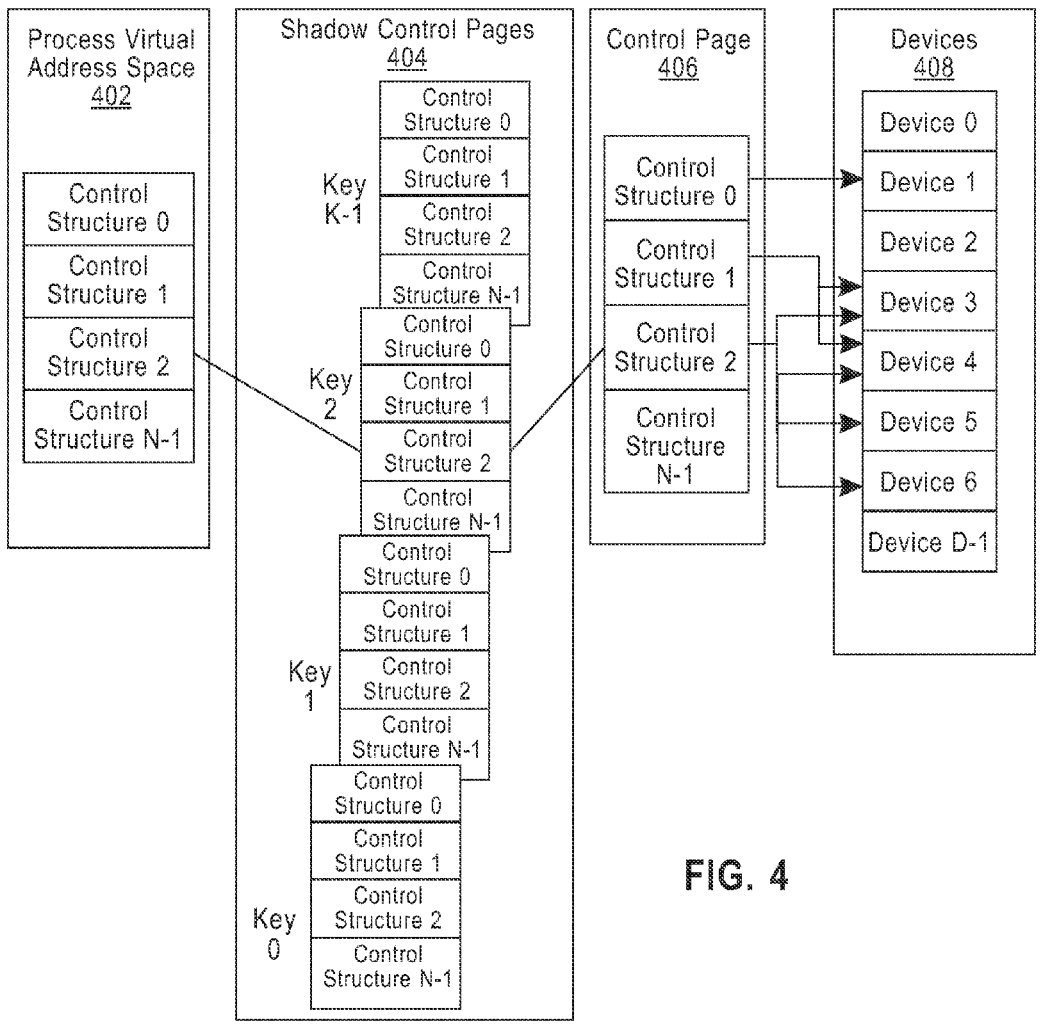

MECHANISM FOR CONTROLLING SUBSET OF DEVICES

STATEMENT REGARDING FEDERALLY SPONSORED WORK

This invention was made with United States Government support under contract number B599858 entered with the following United States Governmental Agency: Department of Energy. The United States government has certain rights to this invention.

TECHNICAL FIELD

The present invention relates generally to utilization of hardware devices, and more particularly to protected control of subsets of devices.

BACKGROUND

Hardware devices often have multiple, independent instances. For example, within the context of an accelerator performing multiple computations, the accelerator may have several processing units. Different subsets of these units may be allocated to different user-mode processes. With such a large number of subsets, it may be important to make sure that a process is only able to access a subset or subsets of devices which are allocated to the process.

SUMMARY

The present invention provides a method, system, and computer program product for allowing control of a subset of devices. A computer detects a request by a process for access to a shadow control page, wherein the shadow control page allows the process access to one or more devices. The computer assigns the shadow control page and a key to the process associated with the request. The computer detects a request by the process via the assigned shadow control page for creation of a subset of devices from the one or more devices. The computer inputs information detailing an association between the subset of devices and the assigned key into a subset definition table, wherein the subset definition table includes one or more keys and one or more corresponding subsets.

BRIEF DESCRIPTION OF THE DRAWINGS

FIG. 1 illustrates a process control system, in accordance with an embodiment of the invention.

FIG. 2 is a flowchart illustrating the operations of operating system of the computing device in FIG. 1 in assigning a key value to a process, in accordance with an embodiment of the invention.

FIG. 4 is an illustration describing the relationship between the components of the process control system of FIG. 1, in accordance with an embodiment of the invention.

FIG. 5 is an illustration of the subset definition table of FIG. 1, in accordance to an embodiment of the invention.

DETAILED DESCRIPTION

Figure 3:
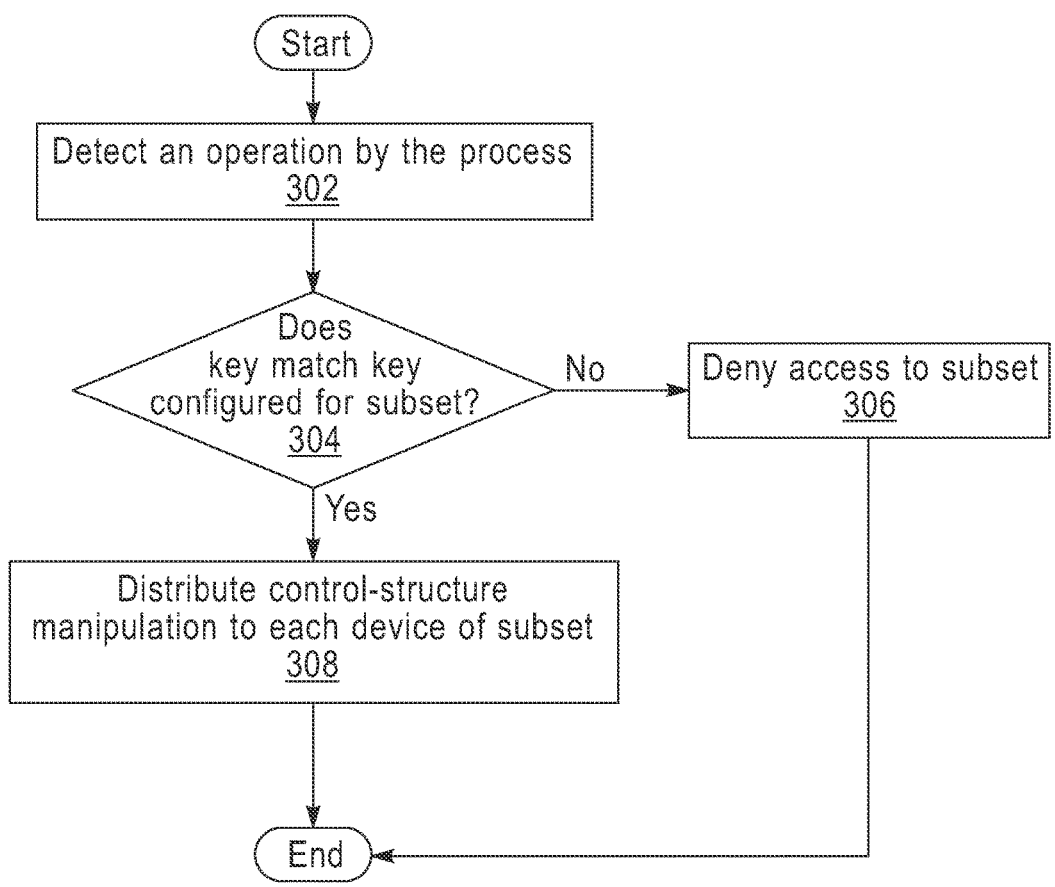
FIG. 3 is a flowchart illustrating the operations of the controller of FIG. 1 in identifying whether a key value associated with a process allows access to one or more subsets of devices, in accordance with an embodiment of the invention.

Embodiments of the present invention will now be described in detail with reference to the accompanying Figures.

FIG. 1 illustrates process control system 100, in accordance with an embodiment of the invention. In an exemplary embodiment, process control system 100 includes computing device 110. In other embodiments, process control system 100 may comprise a cluster of computing devices, each containing one or multiple processing units.

In the example embodiment, computing device 110 includes controller 112, control page 114, subset definition table 116, and operating system 118. Computing device 110 may be a desktop computer, a notebook, a laptop computer, a tablet computer, a handheld device, a smart-phone, a thin client, or any other electronic device or computing system capable of receiving and sending data to and from other computing devices, via a network connection, such as, for example, a wired, wireless, or fiber optic connection. Although not shown, optionally, computing device 110 can comprise a cluster of devices executing the same software to collectively process requests. Computing device 110 is described in more detail with reference to FIG. 3.

Control Page 114 is an input/output page located in the physical address space that contains control structure mechanisms for subsets of devices contained in process control system 100. In the example embodiment, each control structure contained in control page 114 corresponds to a subset of devices and provides a structure that can be utilized by a process (via a shadow control page) to manipulate the subset of devices.

Subset Definition Table 116 is a table containing information detailing an access key and a set characterization for one or more subsets of devices. In the example embodiment, the set characterization for a given subset of devices is a bit vector which contains a plurality of bits, with each bit corresponding to a device. Each bit corresponding to each device denotes whether the device is in the subset or not in the subset based on whether the bit is "on" or "off" (on—in the subset, off—not in the subset). Subset Definition Table 116 is explained in further detail below with regard to FIG. 5.

Operating System 118 is software that manages the hardware and software resources of computing device 110 and provides common services for software located on computing device 110. In the example embodiment, operating system 118 is capable of defining one or more subsets of devices. Furthermore, the operating system is capable of assigning a key to a process (or a user), with the key corresponding to the one or more subsets of devices. The operations and functions of operating system 118 are described in more detail with reference to FIG. 2.

Controller 112 is a hardware device or software application capable of verifying whether a key associated with a process (or a user) allows the process to manipulate a subset of devices by way of allowing manipulation of devices in a subset of devices by way of a device control structure of a control page, such as control page 114, that corresponds to the subset. The operations and functions of controller 112 are described in more detail with reference to FIG. 3.

FIG. 2 is a flowchart illustrating the operations of operating system 118 in assigning a key value to a process. In the example embodiment, operating system 118 detects an operation call made by the process for a key (key value) and a shadow control page (step 202). In the example embodiment, a finite number of keys are created for the purposes of prohibiting access to devices by processes/users that are not authorized to utilize the devices. Each key has a corresponding shadow control page. A shadow control page is a logical copy of control page 114. In order to manipulate a subset, a process utilizes a shadow control page (which contains the device control structures contained in control page 114) to manipulate a subset of devices. Furthermore, the corresponding key for each shadow control page is embedded in the real address of the shadow control page.

In the example embodiment, operating system 118 identifies an unused or unassigned key and assigns the key to the process (step 204). In the example embodiment, operating system 118 maintains information regarding device ownership, subset ownership and key allocation in data structures that may be referenced when identifying an unused or unassigned key to assign to the process. In the example embodiment, operating system 118 assigns the key to the process by way of mapping the shadow control page corresponding to the key into the virtual address space allocated to the process.

Operating system 118 detects an operation call requesting to utilize a set of devices (step 206). Once the request is detected by operating system 118, operating system 118 verifies whether any devices included in the request are owned by another process. In the example embodiment, operating system 118 references subset definition table 116, which contains key values and corresponding subsets of devices, in order to determine whether any of the devices in the request are owned by another process. As stated above, a bit vector denotes which devices contained within each subset. Therefore, if a device is contained in a subset which has a corresponding key value (as per subset definition table 116), the device is owned by another process.

Operating system 118 detects an operation call requesting the creation of one or more subsets from the set of devices (step 208). In the example embodiment, once the operation call is detected, operating system 118 identifies an unused row/entry of subset definition table 116 and inputs a bit vector detailing the requested subset and the calling process's assigned key value into the identified row of subset definition table 116 (step 210). As stated above, a bit vector denotes whether the device is in the subset or not in the subset based on whether the bit is "on" or "off" (on—in the subset, off—not in the subset). Therefore, operating system 118 turns the bits on which correspond to the devices in the requested subset. In addition, each row has a corresponding device control structure that may be utilized by the process in order to manipulate the subset of devices. Once the bit vector information has been input into subset definition table 116, operating system 118 communicates with the process/user in order to notify the process/user of the row/entry of the subset definition table so that the process/user is aware of the corresponding device control structure that is to be utilized. For example, if operating system 118 detects a request from a process to create a subset of devices which include device A, device B, and device C, and operating system 118 determines that row 4 of subset definition table 116 is unused, operating system 118 may input a bit vector denoting device A, device B, and device C into row 4 along with the key assigned to the process. Continuing the example, row 4 of subset definition table 116 may be associated with device control structure 4 of control page 114, and therefore, operating system 118 notifies the process that it should use device control structure 4 to interact with the device subset consisting of device A, device B, and device C.

FIG. 3 illustrates the operations of controller 112 in identifying whether a key value associated with a process allows access to one or more subsets of devices, in accordance with an embodiment of the invention. In the example embodiment, controller 112 detects an operation by the process (step 302). For example, controller 112 may detect a store request to a virtual address. Once the process requests the store, the virtual address is translated to a real/physical address by the memory management unit of computing device 110. In the example embodiment, bits that specify the relevant device control structure and bits that specify a specific byte within the device control structure that the store request pertains to are embedded in the virtual address. Furthermore, the key associated with the process is embedded in the translated physical address (which is a physical address falling within the shadow control page mapped into the virtual address space of the process as described above).

Controller 112 determines whether the key (key value) matches the key configured for the subset (decision 304). In the example embodiment, controller 112 determines whether the key embedded in the physical address matches the key value associated with the subset of devices associated with the operation being performed by the process. As stated above, each subset of devices has a corresponding device control structure. Therefore, controller 112 identifies the relevant device control structure from the bits embedded in the virtual address associated with the operation and determines the subset based on the relevant device control structure. In the example embodiment, controller 112 references subset definition table 116 in order to determine the key (key value) corresponding to the particular subset of devices. Controller 112 then compares the key embedded in the physical address to the key identified in subset definition table 116.

If controller 112 determines that the key does not match the key configured for the subset (decision 304, "NO" branch), controller 112 denies access to the subset of devices (step 306). If controller 112 determines that the key matches the key configured for the subset (decision 304, "YES" branch), controller 112 distributes the control-structure manipulation to all devices contained within the particular subset (step 308). For example, if the process is trying to perform a store operation to subset 4 (which contains device A, device B, and device C), the process performs a store operation to a virtual address which is mapped to the physical address of device control structure 4 within the shadow control page, as stated above. Controller 112 then compares the key embedded in the physical address of the shadow control page to the key identified in subset definition table 116 as corresponding to subset 4. If the keys match, controller 112 allows access to the devices in subset 4 by way of the corresponding device control structure (i.e.— device control structure 4), and distributes the store operation to all devices contained in the subset. If the keys do not match, controller 112 does not allow the process to access device control structure 4.

FIG. 4 is an illustration describing the relationship between the components of process control system 100, in accordance with an embodiment of the invention. FIG. 4 includes process virtual address space 402, shadow control pages 404, control page 406, and devices 408. As described above, a shadow control page of shadow control pages 404 is mapped into process virtual address space 402 as shown. The process is then able to perform an operation to the virtual address space which is then translated to a real/physical address (which is depicted by shadow control pages 404). Shadow control pages 404 are logical copies of control page 406 which are able to be utilized by the process to manipulate a subset (if process has permission to access the subset). For example, the process may utilize control structure 1 of an assigned shadow control page of shadow control pages 404 to manipulate the corresponding subset of devices (in this case devices 3 and 4). The process may also utilize control structure 2 of an assigned shadow control page of shadow control pages 404 in order to manipulate the corresponding subset of devices (in this case devices 3, 4, 5, and 6).

FIG. 5 is an illustration of the subset definition table 116, in accordance to an embodiment of the invention. As described above, subset definition table 116 includes key values and corresponding subsets of devices input by operating system 118. In the example embodiment, subset definition table 116 includes entry 502, entry 504, and entry 506. Entry 502 includes key 0 which corresponds to subset 0, entry 504 includes key 1 which corresponds to subset 1, and entry 506 includes key 2 which corresponds to subset 2. As described above, after the process performs an operation to a virtual address in virtual address space 402, the virtual address is translated to a real/physical address. Controller 112 then verifies whether the key embedded in the real/physical address allows access to the subset pertaining to the operation request. For example, if the process performs an operation to a virtual address corresponding to control structure 0, which corresponds to subset 0, controller 112 verifies whether the key value embedded in the real/physical address of the translated real address allows access to subset 0. In the example embodiment, controller 112 performs this verification step by referencing subset definition table 116 and comparing the embedded key value to the key value in entry 502 (key 0) to see if the keys match. If the keys match, controller 112 allows the process to access the devices of subset 0. If the keys do not match, controller 112 does not all the process to access the devices of subset 0.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 6:
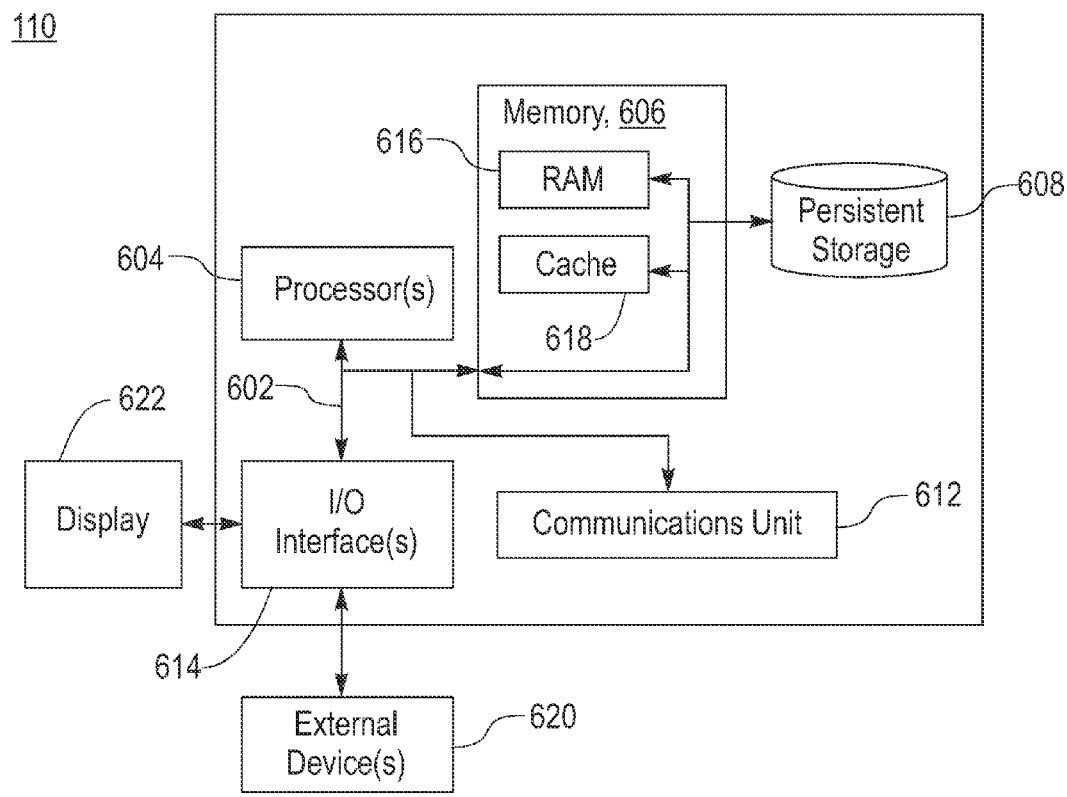
FIG. 6 is a block diagram depicting the hardware components of the process control system of FIG. 1, in accordance with an embodiment of the invention.

FIG. 6 depicts a block diagram of components of computing device 110 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

The programs controller 112, control page 114, subset definition table 116, and operating system 118 in computing device 110 are stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. The programs controller 112, control page 114, subset definition table 116, and operating system 118 in computing device 110, may be downloaded to persistent storage 608 through communications unit 612.

I/O interface(s) 614 allows for input and output of data with other devices that may be connected to computing device 110. For example, I/O interface 614 may provide a connection to external devices 620 such as, a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention, e.g., controller 112, control page 114, subset definition table 116, and operating system 118 in computing device 110, can be stored on such portable computer-readable storage media and can be loaded onto persistent storage 608 via I/O interface(s) 614. I/O interface(s) 614 can also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for allowing control of a subset of devices, comprising the steps of:
    a computer detecting a request by a process for access to a shadow control page, wherein the shadow control page allows the process access to one or more devices;
    the computer assigning the shadow control page and a key to the process associated with the request, wherein assigning the shadow control page and the key to the process associated with the request further comprises the computer mapping the shadow control page into virtual address space assigned to the process, and wherein the key is embedded in a real address falling within the shadow control page;
    the computer detecting a request by the process via the assigned shadow control page for access to a subset of bytes from the one or more devices; and
    the computer inputting information detailing an association between the subset of bytes and the assigned key into a subset definition table, wherein the subset definition table includes one or more keys and one or more corresponding subsets.

2. The method of claim 1, further comprising:
    the computer detecting a request by the process for access to the subset of bytes;
    the computer determining that the key assigned to the process matches the key input into the subset definition table in association with the subset of bytes; and
    the computer allowing the process access to the subset of bytes.

3. The method of claim 1, further comprising:
    the computer detecting a request by another process for access to the subset of bytes;
    the computer determining that an another key assigned to the another process does not match the key input into the subset definition table in association with the subset of bytes; and
    the computer denying the another process access to the subset of bytes.

4. The method of claim 1, wherein a location within the subset definition table where the computer has input information detailing the association between the subset of bytes and the assigned key corresponds to a device control structure, wherein the device control structure allows a process to manipulate the subset of bytes.

5. The method of claim 4, further comprising the computer notifying the process to utilize the device control structure corresponding to the location within the subset definition table for manipulation of the subset of bytes.

6. The method of claim 1, wherein the shadow control page is a copy of a single control page that contains one or more device control structures capable of being used to manipulate each subset of bytes of the one or more devices.

7. A computer program product for allowing control of a subset of devices, the computer program product comprising:
    one or more computer-readable storage devices and program instructions stored on at least one of the one or more computer-readable storage devices, the program instructions comprising:
    program instructions to detect a request by a process for access to a shadow control page, wherein the shadow control page allows the process access to one or more devices;
    program instructions to assign the shadow control page and a key to the process associated with the request, wherein assigning the shadow control page and the key to the process associated with the request further comprises the computer mapping the shadow control page into virtual address space assigned to the process, and wherein the key is embedded in a real address falling within the shadow control page;
    program instructions to detect a request by the process via the assigned shadow control page for access to a subset of bytes from the one or more devices; and
    program instructions to input information detailing an association between the subset of bytes and the assigned key into a subset definition table, wherein the subset definition table includes one or more keys and one or more corresponding subsets.

8. The computer program product of claim 7, further comprising:
    program instructions to detect a request by the process for access to the subset of bytes;
    program instructions to determine that the key assigned to the process matches the key input into the subset definition table in association with the subset of bytes; and
    program instructions to allow the process access to the subset of bytes.

9. The computer program product of claim 7, further comprising:
    program instructions to detect a request by another process for access to the subset of bytes;
    program instructions to determine that an another key assigned to the another process does not match the key input into the subset definition table in association with the subset of bytes; and
    program instructions to deny the another process access to the subset of bytes.

10. The computer program product of claim 7, wherein a location within the subset definition table containing the information detailing the association between the subset of bytes and the assigned key corresponds to a device control structure, wherein the device control structure allows a process to manipulate the subset of bytes.

11. The computer program product of claim 10, further comprising program instructions to notify the process to utilize the device control structure corresponding to the location within the subset definition table for manipulation of the subset of bytes.

12. The computer program product of claim 7, wherein the shadow control page is a copy of a single control page that contains one or more device control structures capable of being used to manipulate each subset of bytes of the one or more devices.

13. A computer system for allowing control of a subset of bytes, the computer system comprising:
    one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
    program instructions to detect a request by a process for access to a shadow control page, wherein the shadow control page allows the process access to one or more devices;
    program instructions to assign the shadow control page and a key to the process associated with the request, wherein assigning the shadow control page and the key to the process associated with the request further comprises the computer mapping the shadow control page into virtual address space assigned to the process, and wherein the key is embedded in a real address falling within the shadow control page;

program instructions to detect a request by the process via the assigned shadow control page for access to a subset of bytes from the one or more devices; and program instructions to input information detailing an association between the subset of bytes and the assigned key into a subset definition table, wherein the subset definition table includes one or more keys and one or more corresponding subsets.

14. The computer system of claim 13, further comprising:

program instructions to detect a request by the process for access to the subset of bytes;

program instructions to determine that the key assigned to the process matches the key input into the subset definition table in association with the subset of bytes; and program instructions to allow the process access to the subset of bytes.

15. The computer system of claim 13, further comprising:

program instructions to detect a request by another process for access to the subset of bytes;

program instructions to determine that an another key assigned to the another process does not match the key input into the subset definition table in association with the subset of bytes; and program instructions to deny the another process access to the subset of bytes.

16. The computer system of claim 13, wherein a location within the subset definition table containing the information detailing the association between the subset of bytes and the assigned key corresponds to a device control structure, wherein the device control structure allows a process to manipulate the subset of bytes.

17. The computer system of claim 16, further comprising program instructions to notify the process to utilize the device control structure corresponding to the location within the subset definition table for manipulation of the subset of bytes.

* * * * *